US012403064B1

(12) United States Patent
Peng

(10) Patent No.: US 12,403,064 B1
(45) Date of Patent: Sep. 2, 2025

(54) MASSAGER

(71) Applicants: SHENZHEN USEEKER TECHNOLOGY CO., LTD, Shenzhen (CN); SHENZHEN ZHONGHONGTIAN TECHNOLOGY CO., LTD., Shenzhen (CN)

(72) Inventor: Kun Peng, Shaodong (CN)

(73) Assignees: SHENZHEN USEEKER TECHNOLOGY CO., LTD, Shenzhen (CN); SHENZHEN ZHONGHONGTIAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/812,087

(22) Filed: Aug. 22, 2024

(30) Foreign Application Priority Data

Jul. 26, 2024 (CN) ......................... 202421784692.9

(51) Int. Cl.
*A61H 19/00* (2006.01)

(52) U.S. Cl.
CPC ............. *A61H 19/44* (2013.01); *A61H 19/34* (2013.01); *A61H 2201/1409* (2013.01); *A61H 2201/5035* (2013.01)

(58) Field of Classification Search
CPC .......... A61H 7/00; A61H 7/007; A61H 7/008; A61H 19/34; A61H 19/40; A61H 21/00;
(Continued)

(56) References Cited

U.S. PATENT DOCUMENTS 8,784,345 B2 * 7/2014 Peddicord .............. A61H 19/40 607/39
9,241,866 B2 * 1/2016 Golan .................... A61H 19/44
(Continued)

FOREIGN PATENT DOCUMENTS

EP 2735299 A1 * 5/2014 ............. A61H 19/44

OTHER PUBLICATIONS

Howsam, English Translation of "18812087_2025-01-07_EP_2735299_A1_I.pdf", May 28, 2014 (Year: 2014).*

*Primary Examiner* — Colin W Stuart
(74) *Attorney, Agent, or Firm* — HOWARD M COHN and Associates, LLC

(57) ABSTRACT

A massager includes a massager body, a vibrating assembly, and an expansion massage structure. The massager body includes a mounting portion and a massage portion. The mounting portion defines a mounting cavity. The massage portion defines an accommodating cavity. The massage portion is configured to insert into a human body cavity to perform massage. The vibrating assembly is mounted in the accommodating cavity and drives the massage portion to vibrate. The expansion massage structure includes a pneumatic system and at least one expansion portion. The pneumatic system is mounted in the mounting cavity and inflates and deflate at least one expansion portion. The at least one expansion portion is disposed on a periphery of the massage portion or one end of the massage portion away from the mounting portion, and the at least one expansion portion is configured to insert into the human body cavity to perform massage.

16 Claims, 13 Drawing Sheets

(58) Field of Classification Search
CPC .... A61H 23/00; A61H 23/004; A61H 23/006; A61H 19/00; A61H 19/44; A61H 23/02; A61H 23/0254; A61H 23/0263; A61H 2023/002; A61H 2201/01; A61H 2201/0103; A61H 2201/1409
USPC .................................. 600/26, 38; 601/46, 61
See application file for complete search history.

(56) References Cited

U.S. PATENT DOCUMENTS

| | | | | |
|---|---|---|---|---|
| 10,932,988 | B2 * | 3/2021 | Shahoian | G16H 20/30 |
| 10,940,078 | B1 * | 3/2021 | Lee | A61H 19/34 |
| 11,771,619 | B1 * | 10/2023 | Yan | A61H 23/0254 600/38 |
| 2003/0073881 | A1 * | 4/2003 | Levy | A61H 19/40 600/38 |
| 2009/0177029 | A1 * | 7/2009 | Alilovich | A61H 23/0254 600/38 |
| 2009/0216076 | A1 * | 8/2009 | Kain | A61H 19/34 600/38 |
| 2011/0105837 | A1 * | 5/2011 | Lee | A61H 19/44 600/38 |
| 2014/0336452 | A1 * | 11/2014 | Shahoian | A61H 19/32 600/38 |
| 2016/0151206 | A1 * | 6/2016 | George | A61H 9/005 128/866 |
| 2017/0087049 | A1 * | 3/2017 | Hutchison | A61H 19/40 |
| 2020/0085681 | A1 * | 3/2020 | Haddock | A61H 9/005 |
| 2020/0337941 | A1 * | 10/2020 | Leivseth | A61H 23/02 |
| 2021/0161757 | A1 * | 6/2021 | Murison | F04B 17/04 |
| 2022/0401293 | A1 * | 12/2022 | Mark | A61H 23/02 |
| 2023/0293863 | A1 * | 9/2023 | Bain | A61H 19/44 |
| 2024/0122789 | A1 * | 4/2024 | Niu | A61H 19/44 |
| 2024/0245573 | A1 * | 7/2024 | Bartholomew | A61M 31/002 |

* cited by examiner

MASSAGER

TECHNICAL FIELD

The present disclosure relates to a technical field of massager devices, and in particular to a massager.

BACKGROUND

Currently, most massagers on the market use a single direct-current (DC) motor to vibrate to realize a massage function. Such massagers have a relatively simple function, lacks diversity and adaptability, and easily leads to a poor user experience.

SUMMARY

Embodiments of the present disclosure provide a massager, which uses a massage portion and at least one airbag to massage different positions of a human body cavity, thereby improving a user experience.

The present disclosure provides a massage. The massager comprises a massager body, a vibrating assembly, and an expansion massage structure. The massager body comprises a mounting portion and a massage portion connected with the mounting portion. The mounting portion defines a mounting cavity. The massage portion defines an accommodating cavity. The massage portion is configured to insert into a human body cavity to massage the human body cavity. The vibrating assembly is mounted in the accommodating cavity and is configured to drive the massage portion to vibrate. The expansion massage structure comprises a pneumatic system and at least one expansion portion. The pneumatic system is mounted in the mounting cavity and is configured to drive the at least one expansion portion to expand and contract. The at least one expansion portion is disposed on one end of the massage portion away from the mounting portion, and the at least one expansion portion is configured to insert into the human body cavity and massage the human body cavity.

In the present disclosure, the massage portion and the at least one expansion portion are configured to insert into the human body cavity and massage the human body cavity. The vibrating assembly drives the massage portion to vibrate, and the pneumatic system drives the at least one expansion portion to expand and contract. During an expansion process of the expansion portion, the human body cavity are compressed, thereby realizing a massage function. The at least one expansion portion is disposed on one side of the massage portion. In this way, the massage portion and the at least one expansion portion massage different positions of the human body cavity, thereby improving the user experience.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

REFERENCE NUMBERS IN THE DRAWINGS

100—massager body; 110—mounting portion; 111—first housing; 112—second housing; 113—mounting cavity; 120—massage portion; 121—accommodating cavity; 122—first surface; 123—wiring channel; 124—third portion; 125—fourth portion; 130—first snapping structure; 140—activity space; 200—vibrating assembly; 300—expansion massage structure; 310—pneumatic system; 311—air pump; 312—control valve; 313—connecting tube; 314—communicating tube; 315—pressure relief valve; 3151—valve housing; 3152—valve core; 3153—reset piece; 316—connecting piece; 3161—first channel; 3162—second channel; 3163—third channel; 320—expansion portion; 321 airbag; 322—protection portion; **322*a*—mounting space; 400—flexible sleeve; 410—main portion; 411—first assembly cavity; 412—first portion; 413—second portion; 430—vibrating portion; 431—second assembly cavity; 450**—gap;

460—second snapping structure; 500—vibrating structure; 600—control board; 700—battery; 800—button assembly.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

As shown in FIGS. 1-6, in one embodiment, the present disclosure provides a massage. The massager comprises a massager body 100, a vibrating assembly 200, and an expansion massage structure 300.

Figure 2:
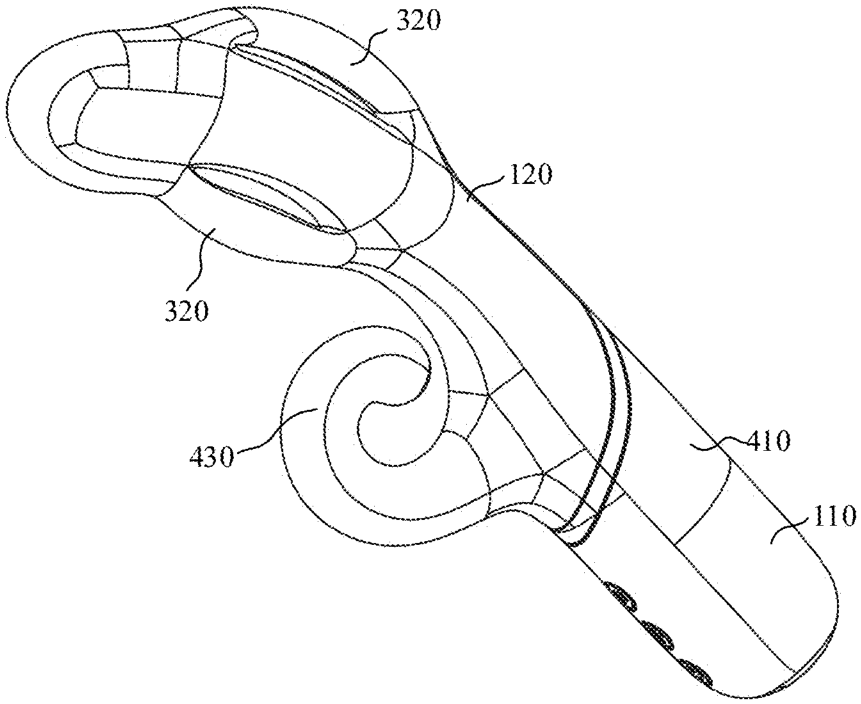
FIG. 2 is a schematic diagram of the massager according to a second embodiment of the present disclosure.
Figure 3:
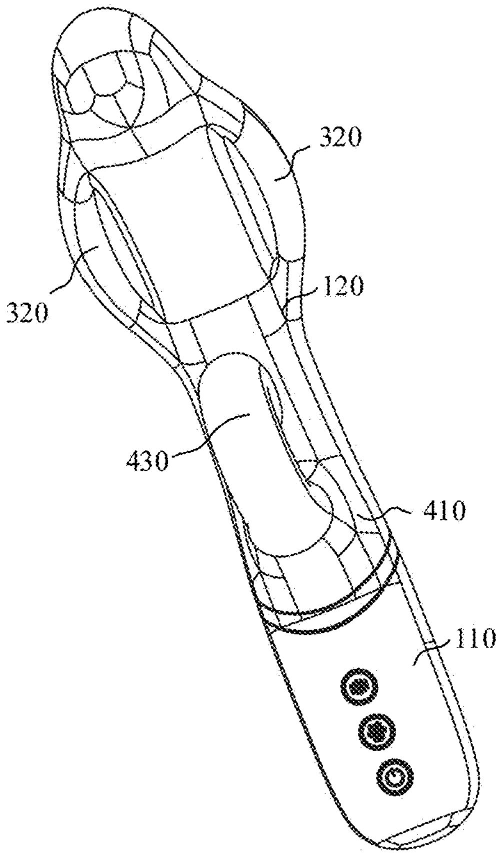
FIG. 3 is a schematic diagram of the massager according to a third embodiment of the present disclosure.
Figure 4:
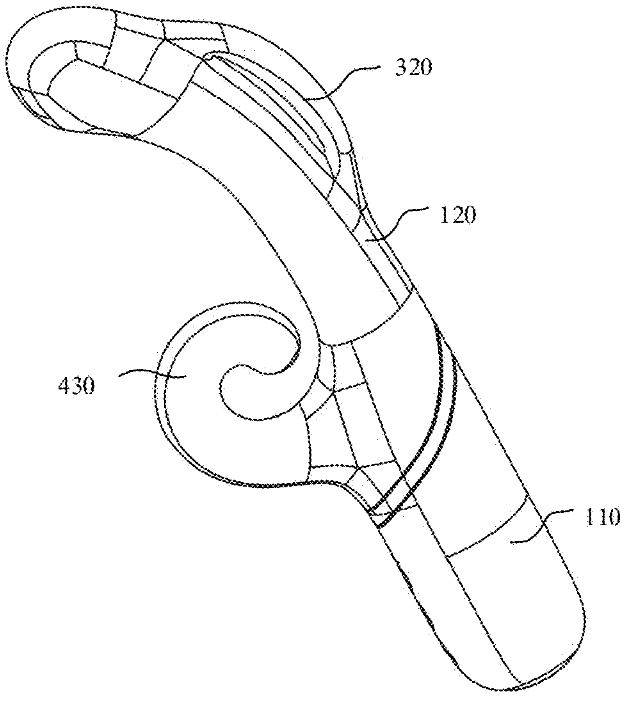
FIG. 4 is a schematic diagram of the massager according to a fourth embodiment of the present disclosure.
Figure 5:
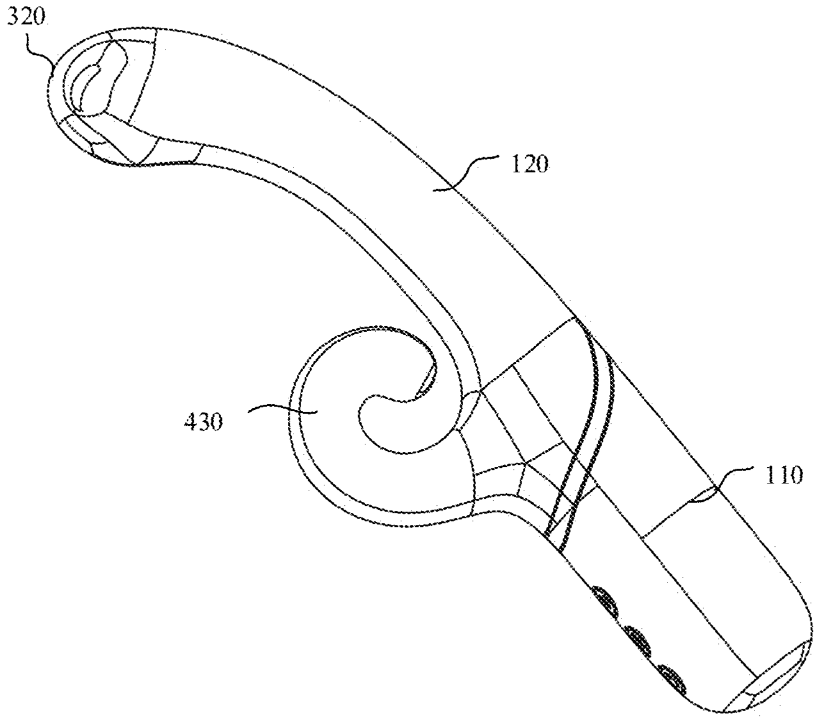
FIG. 5 is a schematic diagram of the massager according to a fifth embodiment of the present disclosure.

As shown in FIGS. 2 and 3, the massager body 100 comprises a mounting portion 110 and a massage portion 120 connected with the mounting portion 110. The mounting portion 110 defines a mounting cavity 113. The massage portion 120 defines an accommodating cavity 121. The vibrating assembly 200 is mounted in the accommodating cavity 121 and is configured to drive the massage portion 120 to vibrate. The massage portion 120 is configured to insert into a human body cavity to massage the human body cavity.

Figure 6:
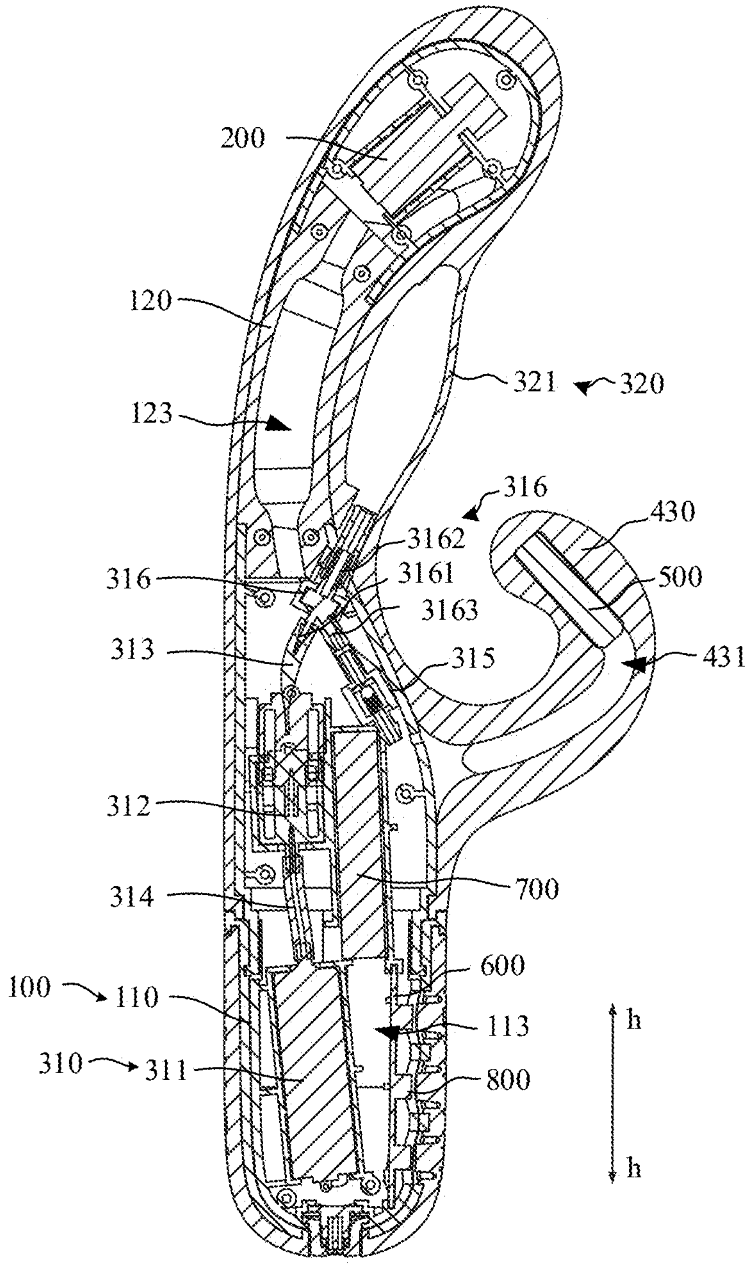
FIG. 6 is a cross-sectional schematic diagram of the massager of the present disclosure where an extension portion thereof is shown in a first alternative configuration.

As shown in FIG. 6, in one embodiment, the massage portion 120 is a silicone keel, the silicone keel is of a columnar structure, and the accommodating cavity 121 is defined in an interior of the massage portion 120. The silicone keel has good toughness and elasticity to shape a specific shape and structure, so as to improve a user experience. Of course, in other embodiments, the massage portion 120 may also be made from rubber. In one embodiment, the accommodating cavity 121 extends in a length direction of the massage portion 120, and the vibrating assembly 200 is slidable in the accommodating cavity 121. In one embodiment, a width of the accommodating cavity 121 is slightly less than a size of the vibrating assembly 200, so that the vibrating assembly 200 is fixed at different positions in the accommodating cavity 121 through a tension of the massage portion 120. Therefore, the massage portion 120 is able to vibrate and massage different positions of the human body cavity. However, a specific form of the massage portion 120 is not limited thereto.

As shown in FIG. 6, in one embodiment, the expansion massage structure 300 comprises at least one pneumatic system 310 and at least one expansion portion 320. The at least one pneumatic system 310 is mounted in the mounting cavity 113. The at least one expansion portion 320 is disposed on one end of the massage portion 120. Specifically, the at least one expansion portion 320 is disposed on the one end of the massage portion 120 away from the mounting portion 110, That is, the at least one expansion portion 320 is disposed on a top portion of the massage portion 120. Alternatively, the at least one expansion portion 320 comprises two expansion portions 320, and the two expansion portions 320 are respectively disposed on a periphery of the massage portion 120 and one end of the massage portion 120 away from the mounting portion 110. However, positions and numbers of the expansion portions 320 are not limited thereto. The at least one expansion portions 320 is configured to insert into the human body cavity and massage the human body cavity.

The at least one expansion portion 320 comprises at least one airbag 321. During use, the at least one pneumatic system 310 inflates and deflates the at least one airbag 321 to drive the at least one airbag 321 to expand and contract. During an expansion process of the at least one airbag 321, the at least one airbag 321 extrude the human body cavity, thereby playing a massage role. The at least one pneumatic system 310 repeatedly inflates and deflates the at least one airbag 321 to generate a continuous massage effect. In one embodiment, by controlling a speed and a frequency of inflation and deflation of the at least one airbag 321, the user is able to adjust a massage intensity and a method of the massager according to personal preferences and physical feelings, thereby obtaining a more personalized massage experience.

It should be noted that, during use, the user is able to hold the mounting portion 110 to adjust a depth of the massage portion 120 and the expansion massage structure 300 inserting into the human body cavity to improve the massage effect.

As shown in FIGS. 1-5, in some embodiments, the massager body 100 has a front surface, side surfaces, and a rear surface. The at least one expansion portion 320 is disposed on the front surface of the massager body 100. Alternatively, the at least one expansion portion 320 is disposed on any one of the side surfaces of the massager body 100. Alternatively, the at least one expansion portion 320 is disposed on the rear surface of the massager body 100. It should be noted that the at least one expansion portion 320 of the present disclosure comprises one or more expansion portions 320. When the expansion portions 320 are provided, the expansion portions 320 are disposed on at least two of the front surface, the side surface, the rear surface, and a top portion of the massager body 100. Of course, the expansion portions 320 may also be disposed on only on one side of the massager body 100. In this way, the user is able to obtain different massage experiences through the expansion portions 320 disposed in different positions and with different massage intensities.

It should be noted that each of the expansion portions 320 may correspond to a corresponding pneumatic system 310, or the expansion portions 320 are corresponding to one pneumatic system 310.

As shown in FIGS. 2 and 3, in some embodiments, the at least one expansion portion 320 of the present disclosure comprises two expansion portions 320. The two expansion portions 320 are respectively disposed on the two side surfaces of the massager body 100, or, the two expansion portions 320 are respectively disposed on the front surface and the rear surface of the massager body 100.

For ease of illustration, the present disclosure takes an example that the massager comprises only one massager and one expansion portion for further description. As shown in FIG. 6, in some embodiments, the massager comprises the pneumatic system 310. The pneumatic system 310 comprises an air pump 311, a control valve 312, and a connecting tube 313. An air outlet of the air pump 311 is communicated with an air inlet of the control valve 312. An air outlet of the control valve 312 is communicated with the connecting tube 313. An air outlet of the connecting tube 313 is communicated with the airbag 321. Air is introduced into the airbag 321 through the air pump 311, the control valve 312, and the connecting tube 313 to inflate the airbag 321. The control valve 312 is communicated with the airbag 321 and an outside, so as to deflate the airbag 321. In this way, the airbag 321 is repeatedly expanded and contracted, so as to meet a massage requirement of the airbag 321 on the human body cavity. Further, the present disclosure further include a communicating tube 314, and the communicating tube 314 is communicated with the air pump 311 and the control valve 312. Both the connecting tube 313 and the communicating tube 314 are made from a flexible material.

Figure 7:
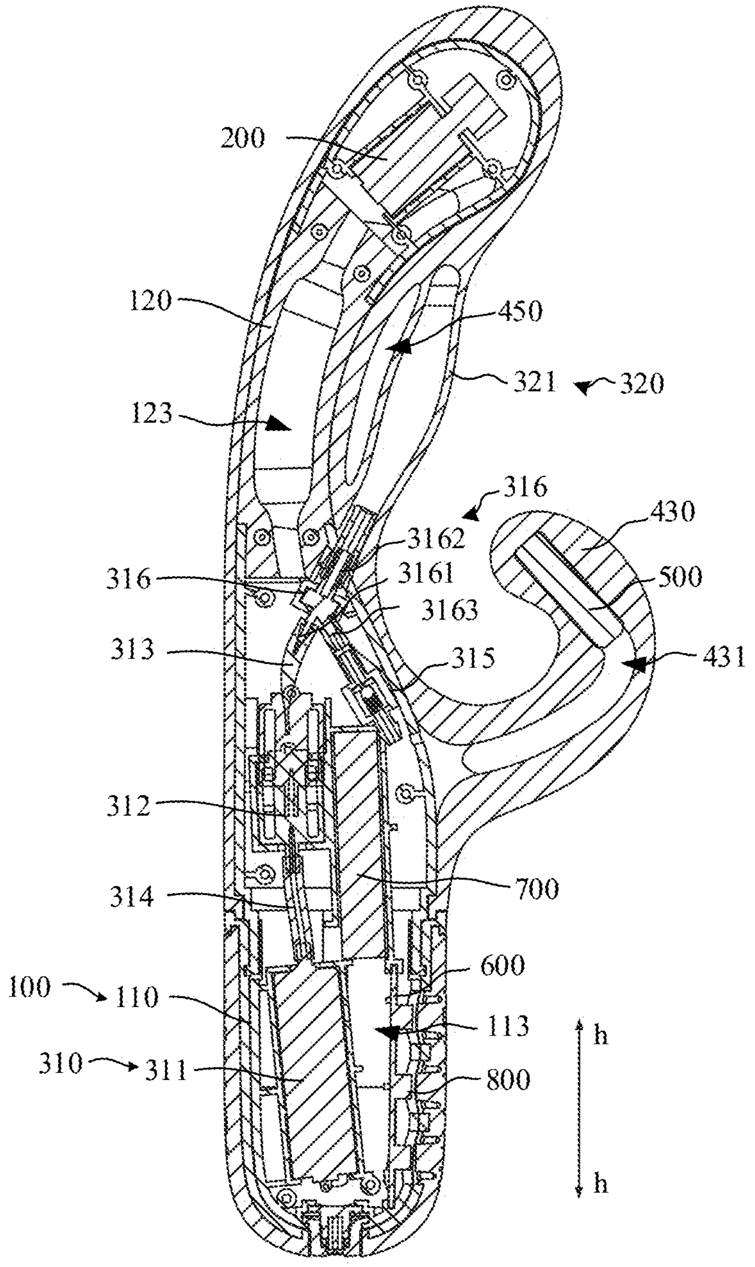
FIG. 7 is a cross-sectional schematic diagram of the massager of the present disclosure where the extension portion is shown in a second alternative configuration.

As shown in FIGS. 6 and 7, the massager further comprises a flexible sleeve 400. The flexible sleeve 400 comprises a main portion. 410. The main portion 410 defines a first assembly cavity 411. The first assembly cavity 411 is configured to accommodate the massager body 100. The airbag 321 is formed on the flexible sleeve 400, and the airbag 321 is connected with the main portion 410. In this way, after the flexible sleeve 400 is sleeved on an outer side of the massager body 100, the airbag 321 is located on the periphery of the massage portion 120 or the one end of the massage portion 120 away from the mounting portion 110, and a mounting operation thereof is simple. In addition, the flexible sleeve 400 is soft and elastic, and provides a comfortable tactile sensation. The main portion 410 wraps the massager body 100, so that a use feeling of directly contacting a hard material is reduced, and comfort and pleasure of use are improved. In addition, the main portion 410 and the airbag 321 are integrally formed on the flexible sleeve 400 by injection molding, which has high processing efficiency. The pneumatic system 310 is communicated with the airbag 321 and is not communicated with the main portion 410. In this way, an airtightness of the airbag 321 is improved, and it is more conducive to the pneumatic system 310 to inflate and deflate the airbag 321.

Figure 10A:
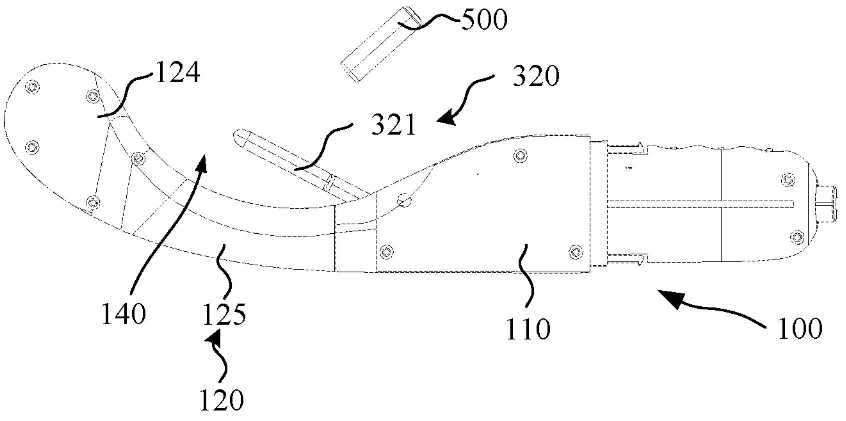
FIG. 10A is an exploded schematic diagram of a massager body of the massager of the present disclosure.
Figure 10B:
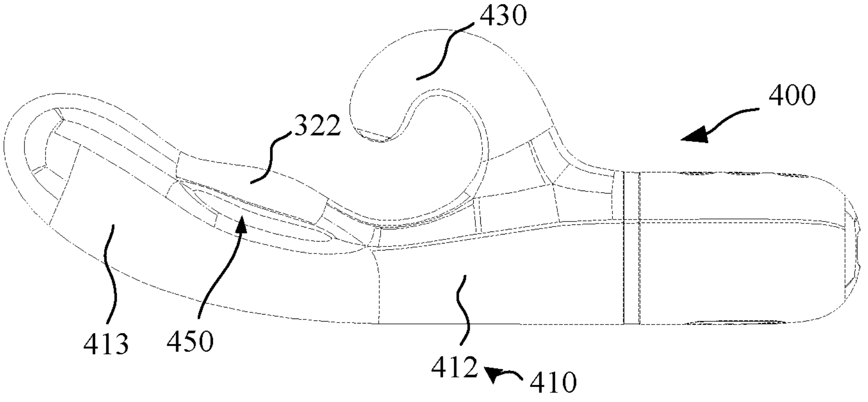
FIG. 10B is a schematic view of a flexible sleeve that sleeves the massager body of the present disclosure.
Figure 11A:
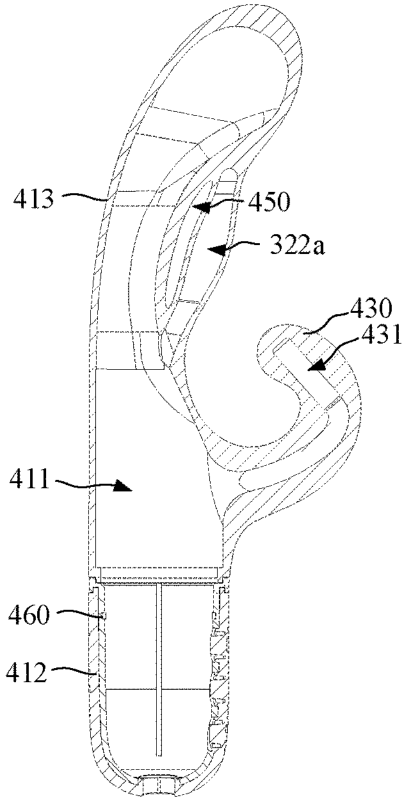
FIG. 11A is a cross-sectional schematic diagram of the flexible sleeve of the present disclosure.
Figure 11B:
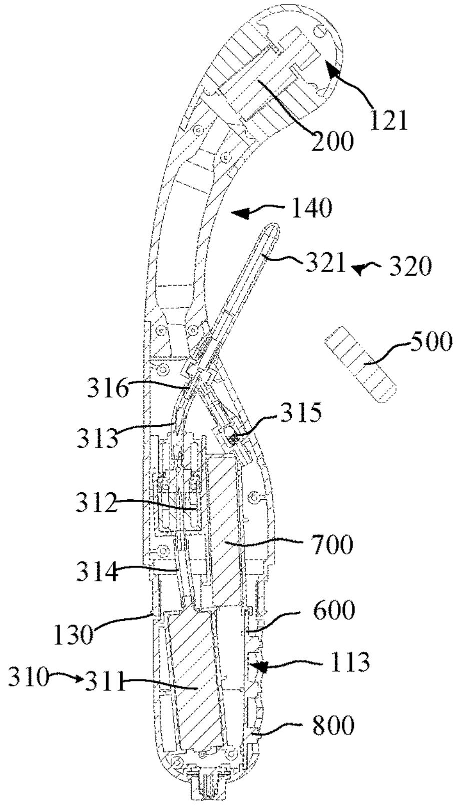
FIG. 11B is an exploded cross-sectional schematic view of the massager body of the present disclosure.

As shown in FIGS. 10-11, in some embodiments, the main portion 410 defines a first assembly cavity 411, and the first assembly cavity 411 is configured to accommodate the massager body 100. As shown in FIG. 6, along a length direction h of the flexible sleeve, one side of the airbag 321 is connected with one side of the main portion 410, and an opening of the airbag 321 is communicated with the first assembly cavity 411. In this way, a connection between the airbag 321 and the main portion 410 is highly stable. In the present disclosure, the opening of the airbag 321 is communicated with the first assembly cavity 411, so that the flexible sleeve 400 has good integrity. Further, the flexible sleeve 400 completely wraps the massager body 100, making a protection effect good. Of course, in other embodiments, the opening of the airbag 321 is not communicated with the first assembly cavity 411, and the main portion 410 defines an opening, and the connecting tube 313 of the pneumatic system 310 extends from the opening of the main portion 410 to connect and communicated with the airbag 321.

As shown in FIG. 7, in some embodiments, along the length direction h of the flexible sleeve 400, two opposite ends of the airbag 321 are connected with the main portion 410 to define a gap 450 between a middle [portion of a protection portion 322 and a. base portion of the protection portion 322.

As shown in FIG. 7, in some embodiments, the airbag 321 comprises a first end and a second end disposed opposite to the first end. The main portion 410 comprises a first portion 412 and a second portion 413 connected with the first portion 412. The first portion 412 is configured to sleeve on an outer side of the mounting portion 110, and the second portion is configured to sleeve on an outer side of the massage portion 120. The first end of the airbag 321 is connected with the first portion 412, and the airbag 321 is connected with the main portion 400 and is communicated with the first assembly cavity 411 through the first end of the airbag 321. The second end of the airbag 321 is connected with the second portion 413. The gap 450 is formed between the airbag 321 and the main portion 410. It is understood that the pneumatic system 310 is mounted on the mounting portion 110, the connecting tube 313 of the pneumatic system 310 extends out of the mounting portion 110, and the first end of the airbag 321 is accordingly connected with the first portion 412, so that the connecting tube 313 is connected and communicated with the flexible sleeve 400. The second end of the airbag 321 is connected with the second portion 413, so that the airbag 321 is sealed at the second end thereof, and the airbag 321 is relatively fixed in a length direction h of the massager. Therefore, the airbag 321 is able to expand in a thickness direction of the massager, which improves comfort of the airbag 321 for massaging the human body cavity.

Figure 8:
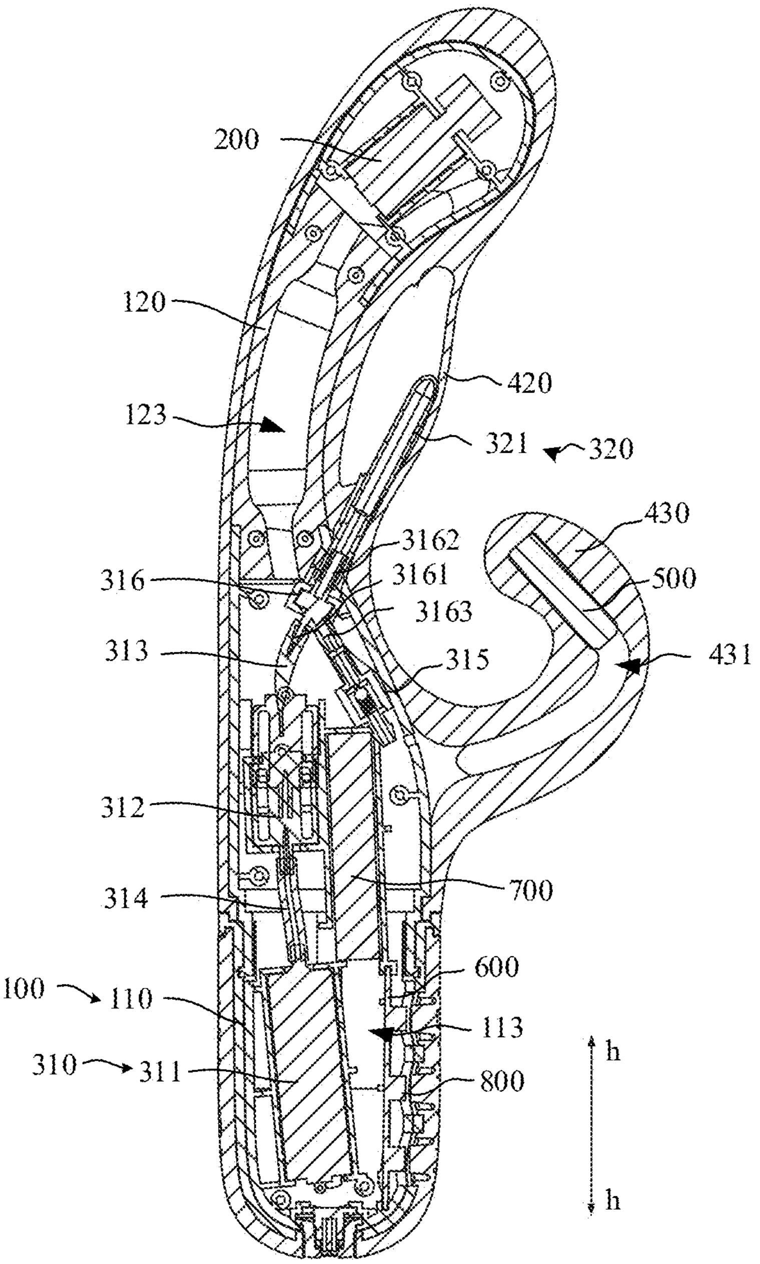
FIG. 8 is a cross-sectional schematic diagram of the massager of the present disclosure where the extension portion is shown in a third alternative configuration.
Figure 9:
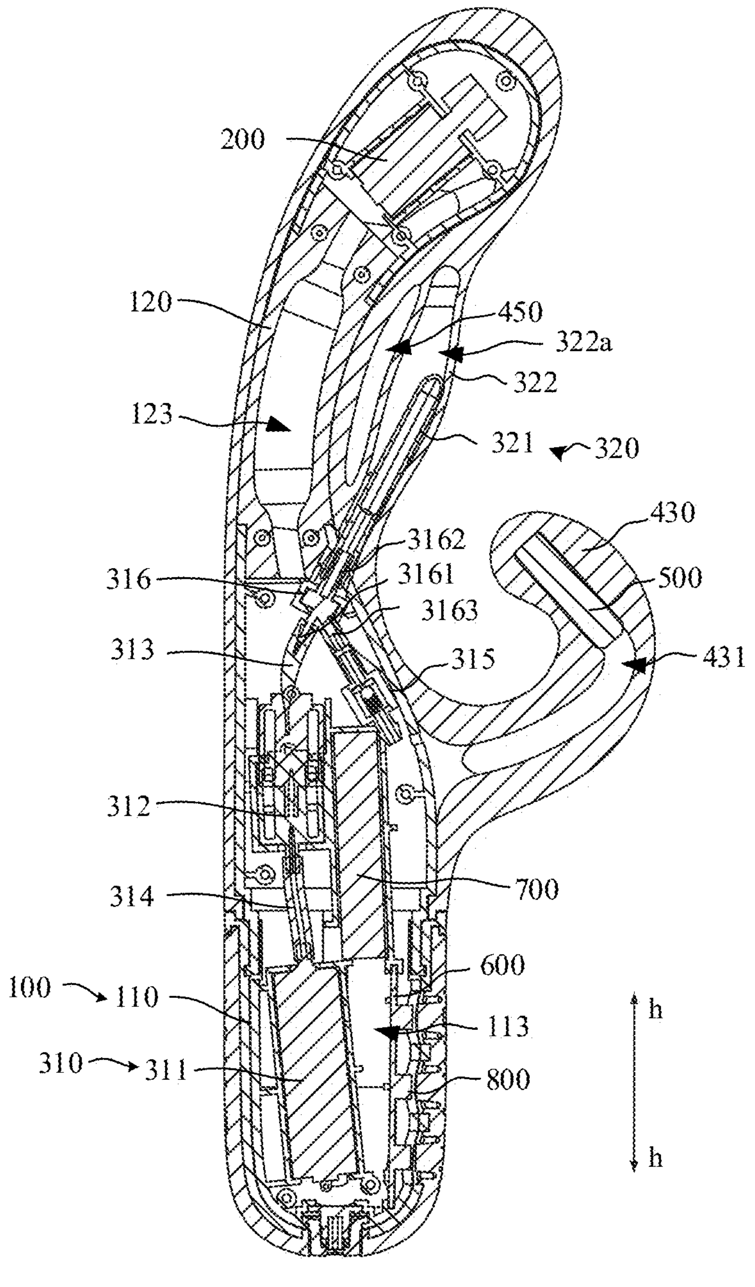
FIG. 9 is a cross-sectional schematic diagram of the massager of the present disclosure where the extension portion is shown in a fourth alternative configuration.

As shown in FIGS. 8 and 9, in some embodiments, the airbag 321 is an independent component, the expansion portion 320 further comprises the protection portion 322 assembled on an outer side of the airbag 321. The protection portion 322 is formed on the flexible sleeve 400. The protection portion 322 is connected with the main portion 410 and defines a mounting space 322 *a*. The airbag 321 extends into the mounting space 322*a*. The protection portion 322 is configured to expand and contract under driving of the airbag 321. In the embodiments, the airbag 321 is the independent component, which improves connection stability between the pneumatic system 310 and the airbag 321. Moreover, the flexible sleeve 400 is assembled on the outer side of the massager body 100 and is sleeved on the outer side of the airbag 321, so that the airbag 321 is protected. Furthermore, if the airbag 321 is broken, the protection portion 322 reduces an impact of the airbag 321 on the human body cavity and brings higher security to the user.

As shown in FIG. 8, in some embodiments, along a length direction h of the flexible sleeve, one side of the protection portion 322 is connected with one side of the main portion 410, and the mounting space 322*a* is communicated with the first assembly cavity 411. In this way, the flexible sleeve 400 has better integrity, and the flexible sleeve 400 completely wraps the massager body 100, so as to achieve better protection effect.

As shown in FIG. 9, in some embodiments, along the length direction h of the flexible sleeve 400, two opposite ends of the protection portion 322 are connected with the main portion 410 to define the gap 450 between a middle portion of the protection portion and the main portion. In this way, the expansion portion 320 has a larger deformation to meet massage needs of different users.

It should be noted that, in some embodiments, the airbag 321 disposed in the flexible sleeve 400 and the protection portion 322 of the flexible sleeve 400 are an integrated component. That is, when the integrated component is connected and communicated with the pneumatic system 310, the integrated component plays a role of the airbag 321 and is inflated or deflated by the pneumatic system 310, so that the integrated component is able to expand and contract to achieve the massage effect. When the integrated component is not connected with the pneumatic system 310, the airbag 321 of the integrated component is configured to drive the integrated component to expand and contract. The integrated component is bale to expand and contract to achieve the massage effect while protecting the airbag 321 thereof. The flexible sleeve 400 is made from materials such as silicone or rubber, which is not limited thereto.

As shown in FIGS. 6-9, in some embodiments, the flexible sleeve 400 further comprises a vibrating portion 430. The vibrating portion 430 is connected with the main portion 410 and disposed on one side of the main portion 410. The vibrating portion 430 defines a second assembly cavity 431. The massager further comprises a vibrating structure 500. The vibrating structure 500 is mounted in the second assembly cavity 431 and is configured to drive the vibrating portion 430 to vibrate The vibrating portion 430 is configured to perform vibration massage on a specific position of a human body.

The vibrating portion 430 vibrates when driven by the vibrating structure 500, which brings a better massage experience to the user. In one embodiment, the vibrating portion 430 is disposed on the front surface of the massager body 100. Of course, in other embodiments, the vibrating portion 430 is disposed on the rear surface of the massager body 100.

In one embodiment, in order to improve the massage effect of the vibrating portion 430, one or more protrusions are disposed on one side of the vibrating portion 430 facing the main portion 410. The present disclosure does not limit the number of the one or more protrusions. In addition, different massage methods are realized by configuring the one or more protrusions into different shapes and structures. For instance, if the one or more protrusions are uneven, a stimulating acupressure massage is provided. If the one or more protrusions are soft balls, a soothing and gentle rolling massage is provided. The one or more protrusions of the present disclosure bring a more concentrated and stimulating massage feeling to the user, and the one or more protrusions deepen the massage effect by stimulating specific acupuncture points or muscle groups.

In one embodiment, the vibrating assembly 200 may comprise a motor, a vibrator, etc. The motor is configured to convert electrical energy into mechanical energy to generate vibration. The vibrator is connected with an output shaft of the motor. The vibrator generates vibration through a rotation of the motor. A structure of the vibrating structure 500 may refer to a structure of the vibrating assembly 200.

Figure 13:
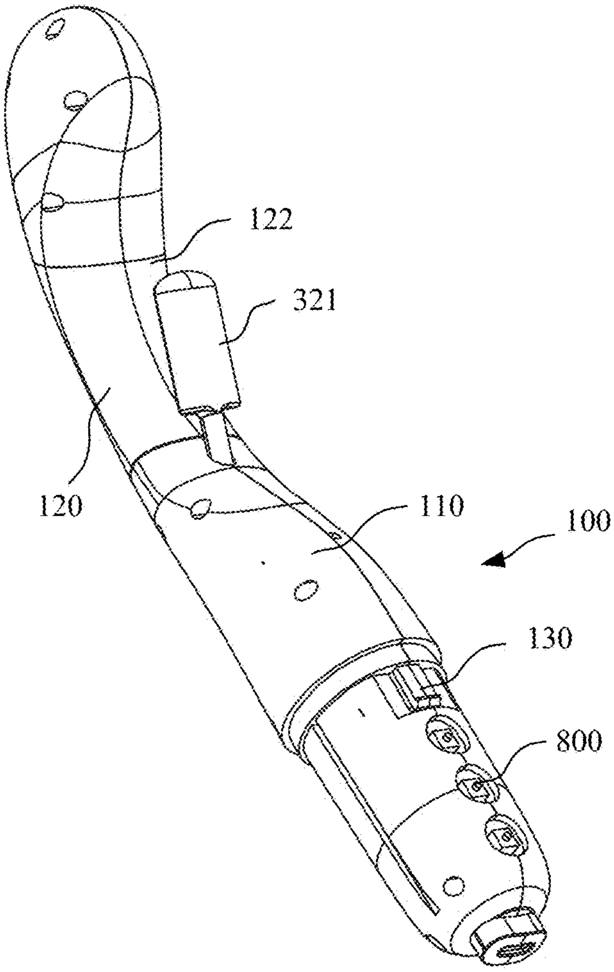
FIG. 13 is a schematic diagram of a massager body assembled with a pneumatic system of the present disclosure.

As shown in FIG. 11 and FIG. 13, in one embodiment, in order to improve mounting stability of the flexible sleeve 400 and the massager body 100, first snapping structures 130 are disposed on an outer wall of the mounting portion 110, second snapping structures 460 are disposed on an inner surface of the flexible sleeve 400, and the first snapping structures 130 are respectively snapped with the second snapping structures 460. The first snapping structures 130 are respectively snapped with the second snapping structures 460 to effectively prevent the flexible sleeve 400 from shifting due to vibration or other external forces during use. The flexible sleeve 400 is fixed to the massager body 100 by the first snapping structures 130 and the second snapping structures 460, which simplify a mounting process, improve assembly efficiency, and make the disassembly and assembly of the flexible sleeve 400 simple and quick, thereby reducing maintenance time and cost. Optionally, the first snapping structures 130 are hooks, and the second snapping structures 460 are grooves. Alternatively, the first snapping structures 130 are the grooves, and the second snapping structures 460 are the hooks.

As shown in FIG. 13, in one embodiment, the massage portion 120 has a first surface 122 of the massage portion 120 bent in an extension direction of the massage portion 120, so as to form an activity space 140 on one side of the massage portion 120. The expansion portion 320 is at least partially located in the activity space 140.

In this way, the expansion portion 320 is within the activity space 140 in a deflated state. At this time, only the massage portion 120 is used for massage. When the expansion portion 320 is in an inflated state, since the first surface 122 of the massage portion 120 is an arc surface, the first surface 122 of the massage portion 120 plays a certain support and limiting effect on the expansion portion 320, thereby controlling an expansion direction of the expansion portion 320 and improving the comfort of the user when the expansion massage structure 300 massages the human body.

Figure 12:
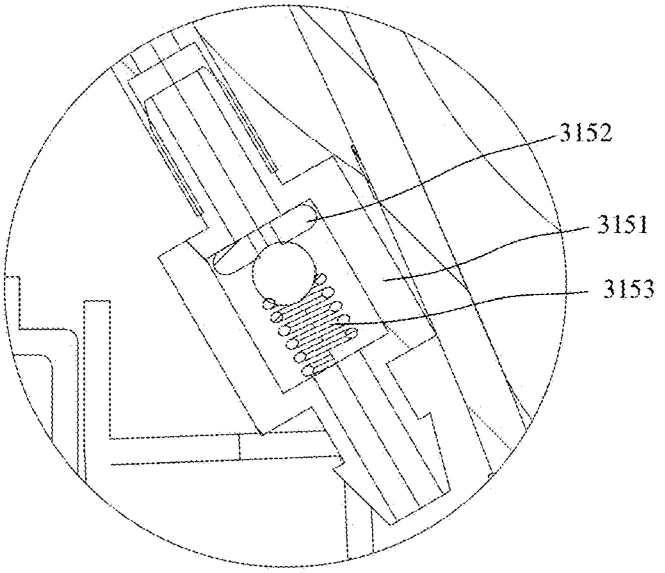
FIG. 12 is a cross-sectional schematic diagram of a pressure relief valve of the present disclosure.

As shown in FIGS. 11-12, in one embodiment, in order to improve safety of the airbag 321, the pneumatic system 310 further comprises a pressure relief valve 315. The pressure relief valve 315 is communicated with the airbag 321. When an air pressure in the airbag 321 is greater than a predetermined value, the pressure relief valve 315 is configured to reduce the air pressure in the airbag 321. The pressure relief valve 315 ensures that the air pressure in the airbag 321 is always within a safe range. When the air pressure in the airbag 321 exceeds the predetermined value, the pressure relief valve 315 automatically opens to release excess air to prevent the airbag 321 from exploding due to overpressure or causing other safety problems.

As shown in FIG. 12, in one embodiment, the pressure relief valve 315 comprises a valve housing 3151, a reset piece 3153, and a valve core 3152. The valve housing 3151 defines a valve cavity, a first opening, and a second opening. The first opening and the second opening are communicated with the valve cavity. The first opening is communicated with the airbag 321, and the second opening is communicated with the outside. The reset piece 3153 and the valve core 3152 are mounted in the valve cavity. When driven by the reset piece 3153, the valve core 3152 is configured to close the first opening. When the air pressure in the airbag 321 is greater than the predetermined value, the valve core 3152 is opened by the air in the airbag 321. A structure of the pressure relief valve 315 is relatively simple, so manufacturing cost is low and the pressure relief valve 315 is easy to maintain and install. The reset piece 3153 may be a spring, and the valve core 3152 is closed when driven by the spring. Moreover, as long as the air pressure in the airbag 321 is greater than an elastic force of the spring, the spring is compressed, thereby opening the valve core 3152, and the air is realized outward. The reset piece 3153 of the present disclosure quickly drives the valve core 3152, so that the pressure relief valve 315 responds quickly and releases the air quickly when the air pressure in the airbag 321 exceeds the predetermined value. Of course, in other embodiments, the reset piece 3153 may be a magnetic piece. The magnetic piece is disposed on one side of the valve cavity, and the valve core 3152 and the magnetic piece are attracted or repelled by a magnetic force. The valve core 3152 close the first opening of the valve cavity under driving of the magnetic force. When the air pressure in the airbag 321 is greater than the magnetic force, the air in the airbag 321 opens the valve core 3152.

As shown in FIGS. 6-9 and 12, in one embodiment, in order to facilitate the communication between the control valve 312, the airbag 321, and the connecting tube 313, the pneumatic system 310 further comprises a connecting piece 316. The connecting piece 316 defines a first channel 3161, a second channel 3162, and a third channel 3163. The first channel 3161, the second channel 3162, and the third channel 3163 are communicated with each other. The first channel 3161 is communicated with the connecting tube 313, the second channel 3162 is communicated with the airbag 321, and the third channel 3163 is communicated with the pressure relief valve 315. In this way, the air pump 311 drives the air to inflate the airbag 321 through the communicating tube 314, the control valve 312, the connecting tube 313, the first channel 3161, and the second channel 3162. Similarly, the air in the airbag 321 is allowed to be released to the outside through the second channel 3162, the connecting tube 313 and the control valve 312. Further, the air in the airbag 321 is also allowed to be released to the outside through the second channel 3162, the third channel 3163, and the pressure relief valve 315.

Figure 14:
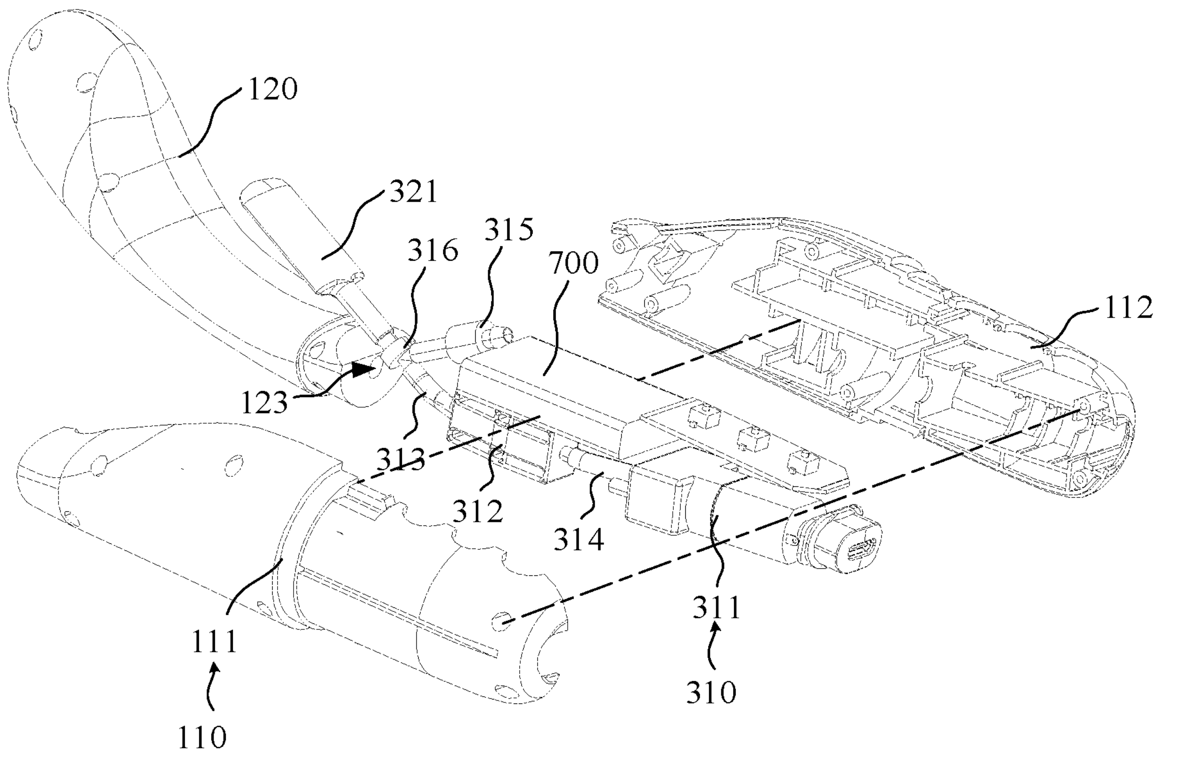
FIG. 14 is an exploded schematic diagram of the massager body and the pneumatic system of the present disclosure.

As shown in FIGS. 13-14, in one embodiment, the massager further comprises a battery 700 and a control board 600. The battery 700 and the control board 600 are mounted in the mounting cavity 113. The battery 700 is configured to provide power to the pneumatic system 310. The control board 600 is configured to adjust a working condition of the pneumatic system 310. In one embodiment, the control board 600 is configured to adjust an output pressure of the pneumatic system 310 and/or a working frequency of the pneumatic system 310. The output pressure of the pneumatic system 310 determines a volume of the airbag 321 after expansion and a volume after deflation, and the working frequency of the pneumatic system 310 determines a period of the airbag 321 of switching between inflation and deflation to meet the massage needs of different users.

In one embodiment, the vibrating assembly 200 is electrically connected with the control board 600 and the battery 700. The battery 700 is configured to provide power to the pneumatic system 310 and the vibrating assembly 200, and the control board 600 is configured to adjust a working condition of the pneumatic system 310 and a working condition of the vibrating assembly 200. Specifically, the control board 600 accurately controls a working mode, the working frequency, and an intensity of the pneumatic system 310. The control board 600 further accurately controls a working mode, a working frequency, and an intensity of the vibrating assembly 200. Therefore, the user is able to adjust the massager to customize the massage effect. Specifically, the user is able to adjust parameters of the control board 600 to personalize the massage effect of the massager according to his/her need and preferences to obtain a more comfortable and satisfactory massage experience. In addition, the control board 600 may integrate a variety of massage modes and setting options, so that the massager has a variety of massage methods and functions. The user is able to choose different massage modes according to needs, such as choosing a vibration mode, choosing a pulse mode, adjusting a massage intensity, etc., to meet massage effects of different parts and health needs. Through intelligent control of the control board 600, the massager provides the user a more personalized and diverse massage experience.

As shown in FIGS. 13-14, in one embodiment, the massager further comprises a button assembly 800. The button assembly 800 is mounted on an outer surface of the mounting portion 110 and is electrically connected with the control board 600. In some structural forms, a surface where the button assembly 800 is mounted on the mounting portion 110 is defined as the front surface of the massager body 100, which is in line with the user's usage habits and enables the user to interact with the massager. The user is able to control the control panel 600 through the button assembly 800 to adjust settings and parameters of the massager, thereby enhancing the convenience and experience of the user. Of course, the user is able to adjust the settings and the parameters of the massager through a touch screen or a wireless remote control, which is not limited thereto.

Figure 15:
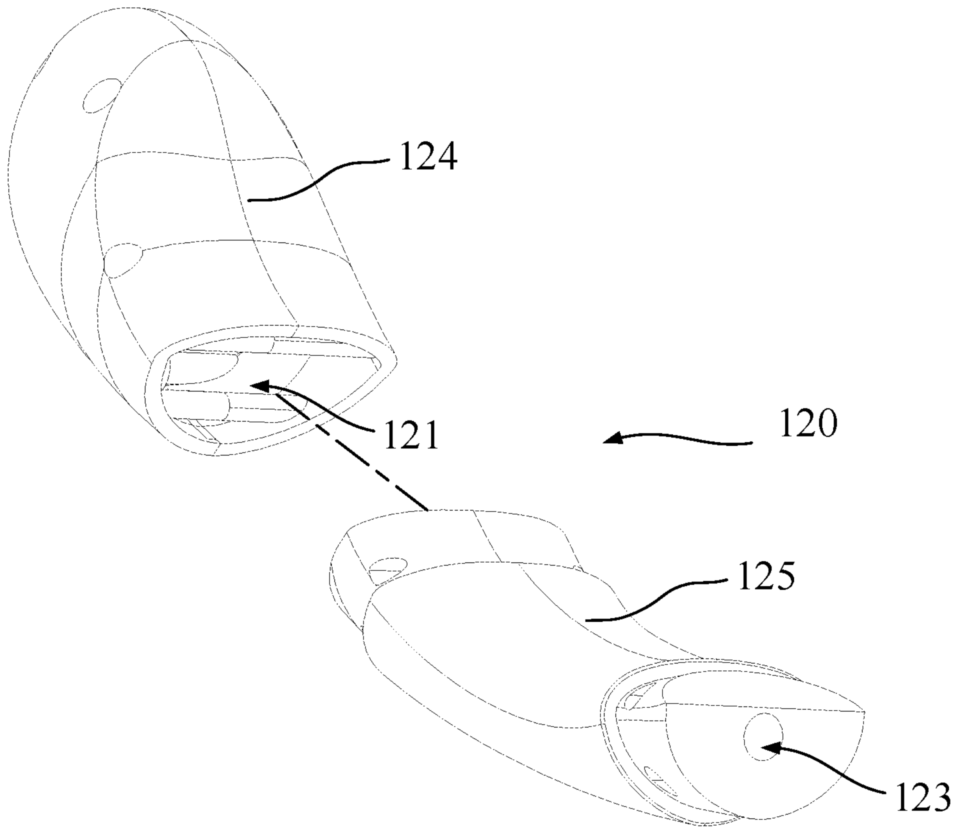
FIG. 15 is an exploded schematic diagram of a massage portion of the present disclosure.
Figure 16:
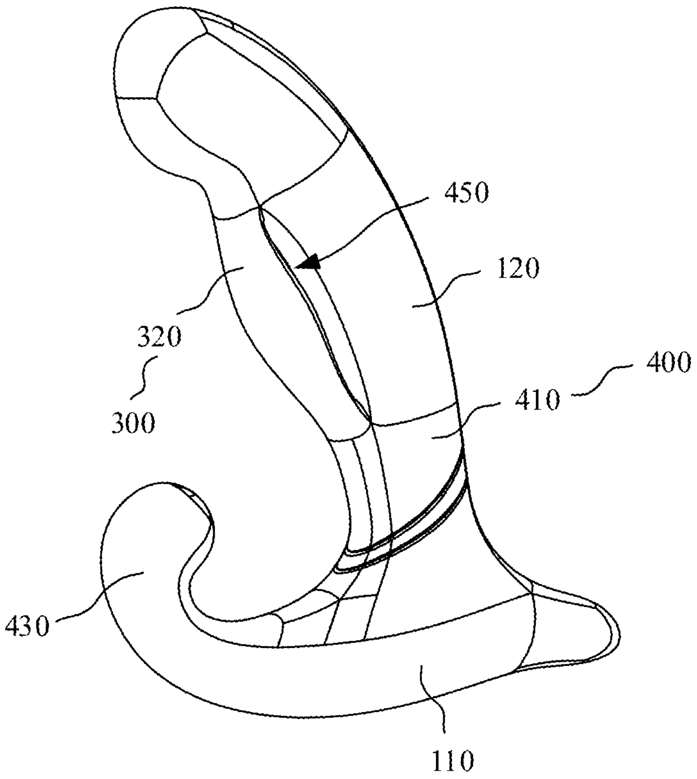
FIG. 16 is a schematic diagram of the massager according to a sixth embodiment of the present disclosure.
Figure 17:
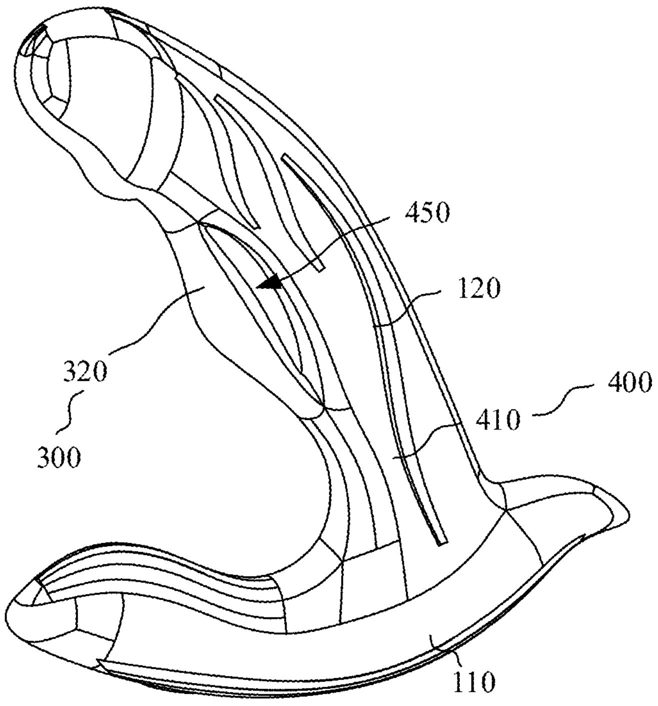
FIG. 17 is a schematic diagram of the massager according to a seventh embodiment of the present disclosure.
Figure 18:
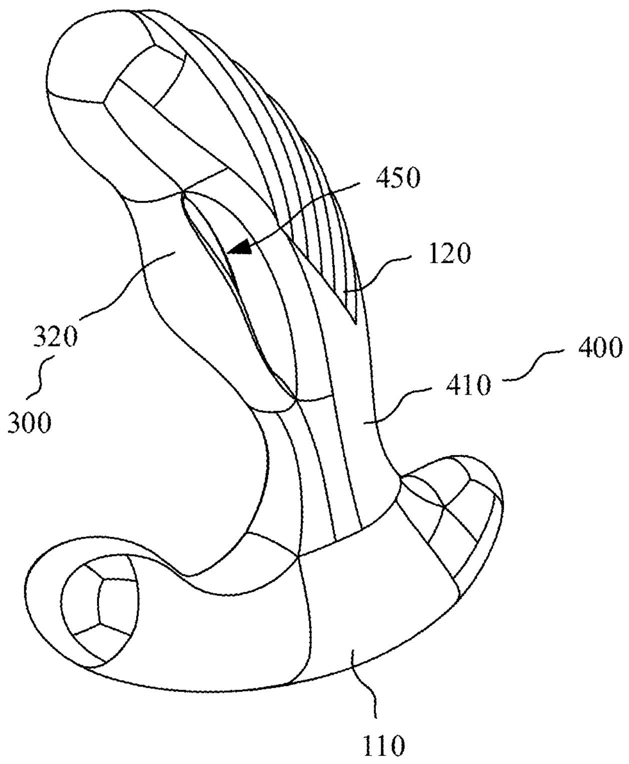
FIG. 18 is a schematic diagram of the massager according to an eighth embodiment of the present disclosure.
Figure 19:
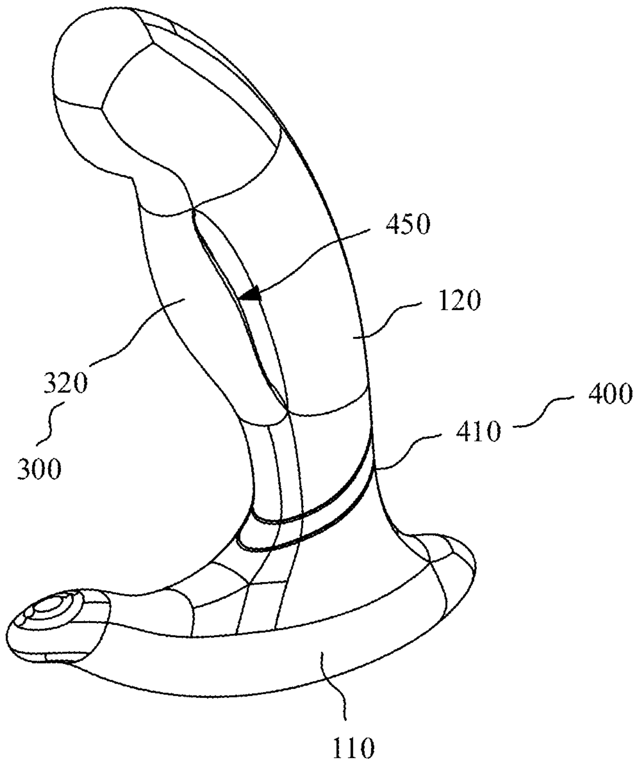
FIG. 19 is a schematic diagram of the massager according to a ninth embodiment of the present disclosure.

As shown in FIGS. 13-15, in one embodiment, in order to facilitate the battery 700 to provide power to the vibrating assembly 200, the massage portion 120 defines h a wiring channel 123. The wiring channel 123 is communicated with the accommodating cavity 121 and the mounting cavity 113. In this way, a first end of a wire assembly is extended into the accommodating cavity 121 through the wiring channel 123 and is electrically connected with the vibrating assembly 200. A second end of the wire assembly is extended into the mounting cavity 113 and is electrically connected with the battery 700. In this way, the vibrating assembly 200 is conveniently electrically connected with the battery 700, and the wire assembly is mounted in the wiring channel 123 in an orderly manner without being messy. In one optional embodiment, the wiring channel 123 is defined in a middle portion of the massage portion 120, so that the wire assembly is disposed in wiring channel and is stably protected by the wire assembly. In one alternative embodiment, the wiring channel 123 is a wiring groove defined in an outer wall of the massage portion 120 and an outer wall of the mounting portion 110. Two opposite sides of the wiring groove are respectively communicated with the accommodating cavity 121 and the mounting cavity 113. However, a specific form of the wiring channel 123 is not limited thereto.

As shown in FIG. 15, in one embodiment, the massage portion 120 comprises a third portion 124 and a fourth portion 125. The third portion 124 is detachably connected with the fourth portion 125. The third portion 124 defines the accommodating cavity 121, and one end of the fourth portion 125 away from the first portion 412 is connected with the mounting portion 110. The massage portion 120 comprises the third portion 124 and the fourth portion 125 that are detachably connected, so that the vibrating assembly 200 is conveniently mounted in the accommodating cavity 121. In one embodiment, the second portion 413 defines the wiring channel 123 that is communicated with the accommodating cavity 121 and the mounting cavity 113. In this way, the vibrating assembly 200 is electrically connected with the battery 700 through the wire assembly. In one alternative embodiment, since the third portion 124 and the fourth portion 125 are detachably connected, the vibrating assembly 200 is defined to have a power supply. In this way, the vibrating assembly 200 is not electrically connected with the battery 700 in the mounting cavity 113, but vibrate through the power supply thereof. When the power supply of the vibrating assembly 200 is out of power, the third portion 124 and the fourth portion 125 are disassembled, and then the vibrating assembly 200 is taken out for charging. A specific form of the power supply of the vibrating assembly 200 is not limited thereto.

The third portion 124 and the fourth portion 125 are detachably connected by snapping, screwing, etc., which is not limited thereto.

As shown in FIG. 14, in one embodiment, in order to facilitate mounting of above-mentioned components in the mounting cavity 113, the mounting portion 110 of the present disclosure includes a first housing 111 and a second housing 112. The first housing 111 is connected with the second housing 112. The first housing 111 and the second housing 112 are enclosed to define the mounting cavity 113. The first housing 111 and the second housing 112 are fixedly connected by one or more forms of screw connection, snap connection, and bonding. The first housing 111 and the second housing 112 are injection molded which is simple to process and enables first housing 111 and the second housing 112 to have complex shapes. The first housing 111 and the second housing 112 are made from, for example, but not limited to, polyethylene (PE), polypropylene (PP), polyvinyl chloride (PVC), polystyrene (PS), polycarbonate (PC), polyamide (PA), and polyester (PET).

Specifically, the first housing 111 and/or the second housing 112 define vent holes communicated with the mounting cavity 113. Thus, the air pump 311 is able to suck air from the outside through the mounting cavity 113 and the vent holes, while the control valve 312 and the pressure relief valve 315 release the air outward through the mounting cavity 113 and the vent holes, facilitating the inflation and deflation of the airbag 321. The vent holes are define on one side of the first housing 111 away from the massage portion 120 and/or one side of the second housing 112 away from the massage portion 120. That is, the vent holes are defined on a bottom portion of the massager body 100. Moreover, an opening of the flexible sleeve 400 is designed to be corresponding to location of the vent holes.

As shown in FIG. 13, in one embodiment, a joint between the massage portion 120 and the mounting portion 110 is smoothly transitioned to reduce a risk of skin irritation or compression from edges or corners of the massager, thereby reducing a risk of skin injury. Especially when the massager vibrates at a high frequency, the joint that is smoothly transitioned effectively protects the skin from irritation or damage. Additionally, the joint that is smoothly transitioned further improves overall stability of the massager. By such design, a combination between the massage portion 120 and the mounting portion 110 is tighter, reducing a possibility of loosening or falling off, and making the massager stable and reliable when in use. Furthermore, the joint that is smoothly transitioned enhances aesthetic appeal of the massager. Whether in terms of appearance design or material texture, the joint that is smoothly transitioned enhance the aesthetics of the massager and make the massager more in line with aesthetic needs of the user.

Figure 1:
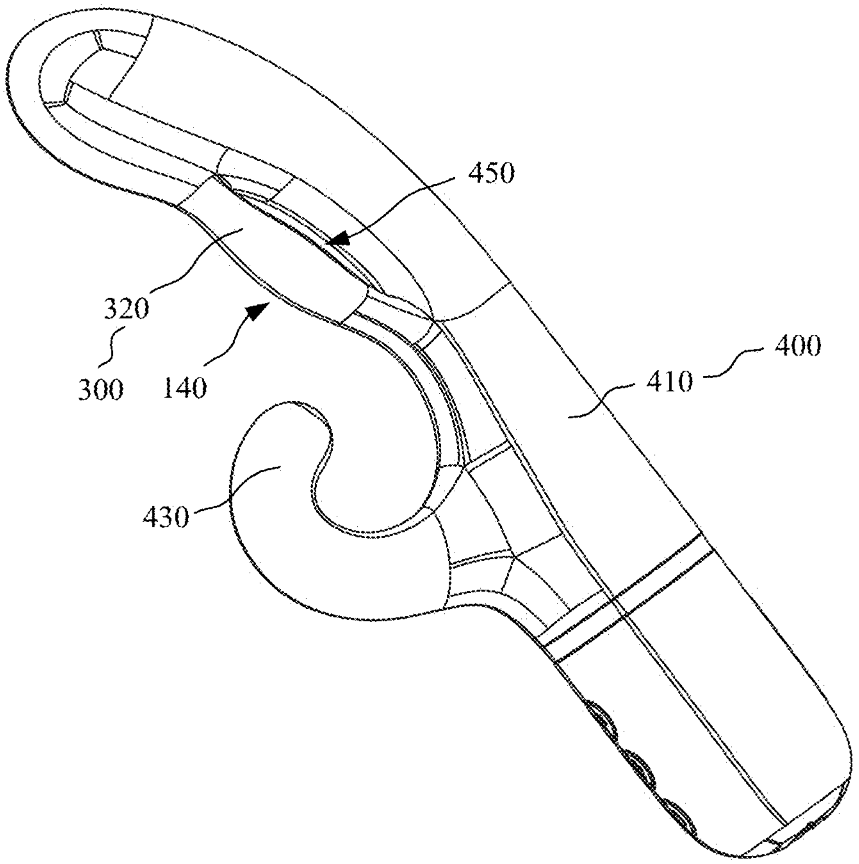
FIG. 1 is a schematic diagram of a massager according to a first embodiment of the present disclosure.

As shown in FIGS. 1-2, in some embodiments, the massage portion 120 and the mounting portion 110 extend in substantially the same direction, so that the user is able to hold the mounting portion 110. As shown in FIGS. 16-19, in some embodiments, the massage portion 120 and the mounting portion 110 extend in different directions. For instance, the mounting portion 110 is curved and arched, and the massage portion 120 is mounted on one side of the mounting portion 110 and is disposed in a mounting groove defined by the mounting portion 110. In these embodiments, a length of the massager is reduced for conveniently transportation and packaging.

In the drawings of the embodiments, the same or similar numbers correspond to the same or similar components. In the description of the present disclosure, it should be understood that terms such as "upper", "lower", "left", "right", etc., indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. A massager, comprising:

a massager body;

a vibrating assembly; and an expansion massage structure;

wherein the massager body comprises a mounting portion and a massage portion connected with the mounting portion, the mounting portion defines a mounting cavity, the massage portion defines an accommodating cavity, and the massage portion is configured to insert into a human body cavity to massage the human body cavity;

wherein the vibrating assembly is mounted in the accommodating cavity, located at a distal end of the accommodating cavity away from the mounting portion, and is configured to drive the massage portion to vibrate;

wherein the expansion massage structure is disposed at a side of the vibrating assembly near the mounting portion and comprises a pneumatic system and at least one expansion portion, the pneumatic system is mounted in the mounting cavity and is configured to drive the at least one expansion portion to expand and contract, the at least one expansion portion is disposed on a periphery of the massage portion, and the at least one expansion portion is configured to insert into the human body cavity and massage the human body cavity;

wherein the at least one expansion portion comprises an airbag, the massager further comprises a flexible sleeve, the flexible sleeve comprises a main portion, the main portion is assembled on an outer side of the massager body, and the airbag is formed on the flexible sleeve;

wherein along a length direction of the flexible sleeve, two opposite ends of the airbag are connected with the main portion to define a gap between a middle portion of the airbag and the main portion.

2. The massager according to claim 1, wherein the massager body has a front surface, side surfaces, and a rear surface, and the at least one expansion portion is disposed on the front surface of the massager body; and/or the at least one expansion portion is disposed on any one of the side surfaces of the massager body; and/or the at least one expansion portion is disposed on the rear surface of the massager body.

3. The massager according to claim 2, wherein the at least one expansion portion comprises two expansion portions, the two expansion portions are respectively disposed on the side surfaces of the massager body; or the two expansion portions are respectively disposed on the front surface and the rear surface of the massager body.

4. The massager according to claim 1, wherein the pneumatic system comprises an air pump, a control valve, and a connecting tube, an air outlet of the air pump is communicated with an air inlet of the control valve, an air outlet of the control valve is communicated with the connecting tube, and the airbag is connected and communicated with the connecting tube.

5. The massager according to claim 4, wherein the pneumatic system is communicated with the airbag and is not fluidly-communicated with the main portion.

6. The massager according to claim 5, wherein the airbag comprises a first end and a second end disposed opposite to the first end, the main portion comprises a first portion and a second portion connected with the first portion, the first portion is configured to sleeve on an outer side of the mounting portion, and the second portion is configured to sleeve on an outer side of the massage portion;

wherein the main portion defines a first assembly cavity, and the first assembly cavity is configured to accommodate the massager body;

wherein the first end of the airbag is connected with the first portion, and the airbag is communicated with the first assembly cavity through the first end thereof, the second end of the airbag is connected with the second portion, and a gap is formed between the airbag and the main portion.

7. The massager according to claim 4, wherein the pneumatic system further comprises a pressure relief valve, the pressure relief valve is communicated with the airbag and an outside, and when an air pressure in the airbag is greater than a predetermined value, the pressure relief valve is configured to reduce the air pressure in the airbag.

8. The massager according to claim 7, wherein the pressure relief valve comprises a valve housing, a reset piece, and a valve core;

wherein the valve housing defines a valve cavity, a first opening, and a second opening, the first opening and the second opening are communicated with the valve cavity, the reset piece and the valve core are mounted in the valve cavity, the first opening is communicated with the airbag, and the second opening is communicated with the outside;

wherein when driven by the reset piece, the valve core is configured to close the first opening; and when the air pressure in the airbag is greater than the predetermined value, the valve core is opened by air in the airbag.

9. The massager according to claim 7, wherein the pneumatic system further comprises a connecting piece, the connecting piece defines a first channel, a second channel, and a third channel, wherein the first channel, the second channel, and the third channel are communicated with each other, the first channel is communicated with the connecting tube, the second channel is communicated with the airbag, and the third channel is communicated with the pressure relief valve.

10. The massager according to claim 1, wherein the massage portion has a first surface facing towards the at least one expansion portion; the first surface is bent away from the at least one expansion portion;

when the at least one expansion portion is not expanded, a gap is formed between the first surface and the at least one expansion portion; and when the at least one expansion portion is expanded, the at least one expansion portion occupies the gap.

11. The massager according to claim 1, wherein the massager further comprises a battery and a control board, the battery and the control board are mounted in the mounting cavity, and the control board is configured to adjust a working condition of the pneumatic system.

12. The massager according to claim 11, wherein the control board is configured to adjust an output pressure of the pneumatic system and/or a working frequency of the pneumatic system.

13. The massager according to claim 11, wherein the massager further comprises a button assembly, and the button assembly is mounted on an outer surface of the mounting portion and is electrically connected with the control board.

14. The massager according to claim 1, wherein the mounting portion comprises a first housing and a second housing, the first housing and the second housing are connected with each other, the first housing and the second housing are enclosed to form the mounting cavity, the first housing and/or the second housing define vent holes communicated with the mounting cavity.

15. A massager, comprising:

a massager body;

a vibrating assembly; and an expansion massage structure;

wherein the massager body comprises a mounting portion and a massage portion connected with the mounting portion, the mounting portion defines a mounting cavity, the massage portion defines an accommodating cavity, and the massage portion is configured to insert into a human body cavity to massage the human body cavity;

wherein the vibrating assembly is mounted in the accommodating cavity, located at a distal end of the accommodating cavity away from the mounting portion, and is configured to drive the massage portion to vibrate;

wherein the expansion massage structure is disposed at a side of the vibrating assembly near the mounting portion and comprises a pneumatic system and at least one expansion portion, the pneumatic system is mounted in the mounting cavity and is configured to drive the at least one expansion portion to expand and contract, the at least one expansion portion is disposed on a periphery of the massage portion, and the at least one expansion portion is configured to insert into the human body cavity and massage the human body cavity;

wherein the at least one expansion portion comprises an airbag and a protection portion assembled on an outer side of the airbag; the massager further comprises a flexible sleeve, and the flexible sleeve comprises a main portion;

wherein along a length direction of the flexible sleeve, two opposite ends of the protection portion are connected with the main portion to define a gap between a middle portion of the protection portion and the main portion.

16. A massager, comprising:

a massager body;

a vibrating assembly; and an expansion massage structure;

wherein the massager body comprises a mounting portion and a massage portion connected with the mounting portion, the mounting portion defines a mounting cavity, the massage portion defines an accommodating cavity, and the massage portion is configured to insert into a human body cavity to massage the human body cavity;

wherein the vibrating assembly is mounted in the accommodating cavity, located at a distal end of the accommodating cavity away from the mounting portion, and is configured to drive the massage portion to vibrate;

wherein the expansion massage structure is disposed at a side of the vibrating assembly near the mounting portion and comprises a pneumatic system and at least one expansion portion, the pneumatic system is mounted in the mounting cavity and is configured to drive the at least one expansion portion to expand and contract, the at least one expansion portion is disposed on a periphery of the massage portion, and the at least one expansion portion is configured to insert into the human body cavity and massage the human body cavity;

wherein the massage portion has a first surface facing towards the at least one expansion portion; the first surface is bent away from the at least one expansion portion;

when the at least one expansion portion is not expanded, a gap is formed between the first surface and the at least one expansion portion; and when the at least one expansion portion is expanded, the at least one expansion portion occupies the gap.

* * * * *